(12) United States Patent
Jang et al.

(10) Patent No.: US 9,223,069 B2
(45) Date of Patent: Dec. 29, 2015

(54) POLARIZER AND METHOD OF MANUFACTURING THE SAME

(71) Applicant: Samsung Display Co., Ltd., Yongin, Gyeonggi-do (KR)

(72) Inventors: Dae-Hwan Jang, Gwangmyeong-si (KR); Jung-Gun Nam, Seoul (KR); Dae-Young Lee, Suwon-si (KR); Gug-Rae Jo, Asan-si (KR); Hyung-Bin Cho, Seongnam-si (KR); Atsushi Takakuwa, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 278 days.

(21) Appl. No.: 13/857,479

(22) Filed: Apr. 5, 2013

(65) Prior Publication Data

US 2014/0146391 A1    May 29, 2014

(30) Foreign Application Priority Data

Nov. 29, 2012    (KR) ........................ 10-2012-0136802

(51) Int. Cl.
*G02B 5/30* (2006.01)
*B29D 11/00* (2006.01)
*G02B 1/10* (2015.01)

(52) U.S. Cl.
CPC ........ *G02B 5/3058* (2013.01); *B29D 11/00644* (2013.01); *G02B 1/105* (2013.01)

(58) Field of Classification Search
CPC . G02B 5/3058; G02B 1/105; B29D 11/00644
USPC ............................ 359/485.05, 487.03; 349/96
See application file for complete search history.

(56) References Cited

U.S. PATENT DOCUMENTS

| 7,858,921 | B2 * | 12/2010 | Stanton et al. | 250/226 |
| 2008/0118660 | A1 * | 5/2008 | Choi et al. | 427/532 |
| 2012/0176676 | A1 | 7/2012 | Sakamoto | |
| 2013/0271834 | A1 * | 10/2013 | Kim et al. | 359/485.05 |

FOREIGN PATENT DOCUMENTS

| JP | 2009-198638 | | 9/2009 | |
| KR | 1020100079856 | | 7/2010 | |
| WO | WO 2009104861 | A1 * | 8/2009 | .............. G02B 5/30 |
| WO | WO 2012091257 | A1 * | 7/2012 | |

\* cited by examiner

*Primary Examiner* — Frank Font
(74) *Attorney, Agent, or Firm* — F. Chau & Associate, LLC

(57) ABSTRACT

A polarizer includes a substrate having a first refractive index, a metal pattern disposed on the substrate, and a passivation layer disposed on the metal pattern. The metal pattern includes a plurality of protrusions having widths. The passivation layer has a second refractive index and covers at least one surface of the protrusions.

20 Claims, 14 Drawing Sheets

POLARIZER AND METHOD OF MANUFACTURING THE SAME

CROSS-REFERENCE TO RELATED APPLICATION

This application claims priority to Korean Patent Application No. 10-2012-0136802, filed on Nov. 29, 2012, the disclosure of which is hereby incorporated by reference herein in its entirety.

1. Technical Field

Exemplary embodiments of the invention relate to a polarizer and method of manufacturing the same. More particularly, exemplary embodiments of the invention relate to a polarizer and method of manufacturing the same for increasing light transmissivity.

2. Discussion of the Related Art

In a liquid crystal display ("LCD") device, the light transmissivity through an array substrate and a facing substrate may be adjusted to display an image according to an arrangement of liquid crystals between the substrates. The LCD device may require a light source to provide light to a LCD panel. The light source is mounted on a backlight assembly of the LCD device. The light from the light source is provided to the LCD panel having the array substrate, the facing substrate and a liquid crystal layer.

The LCD panel includes a polarizer for polarizing the light on an upper surface or a lower surface of the substrates. For example, polyvinyl alcohol ("PVA") is used as the polarizer. The quality of the polarizer is deemed as good when polarization ratio and light transmissivity of the polarizer is high enough.

Recently, a wire grid polarizer has been developed to be used in the LCD panel. The wire grid polarizer transmits or reflects light according to a direction of the wire grid. For example, the light is reflected when the light is incident along a parallel direction to the wire grid and the light is transmitted when the light is incident along a perpendicular direction to the wire grid. The polarization ratio and the light transmissivity of the wire grid polarizer are higher than those of the PVA polarizer. Also, the wire grid polarizer may be used to substitute a dual brightness enhancement film ("DBEF") in the LCD device. Furthermore, the wire grid polarizer has a relatively high thermal resistance.

In a display panel having the wire grid polarizer on a substrate, a passivation layer may be used to protect the wire grid polarizer and to dispose electrodes of the array substrate thereon. However, the passivation layer disposed on the wire grid polarizer may reduce the light transmissivity of the wire grid polarizer.

SUMMARY

Exemplary embodiments of the invention provide a polarizer for increasing light transmissivity of LCD device.

An exemplary embodiment of the invention provides a method of manufacturing the polarizer.

In an exemplary embodiment of the invention, a polarizer is provided. The polarizer includes a substrate having a first refractive index, a metal pattern disposed on the substrate, and a passivation layer disposed on the metal pattern. The metal pattern includes a plurality of protrusions having widths. The passivation layer has a second refractive index and covers at least one surface of the protrusions.

In an exemplary embodiment, the first refractive index may be different from the second refractive index.

In an exemplary embodiment, the first refractive index may be from about 1.4 to about 1.7.

In an exemplary embodiment, the second refractive index may be from greater than about zero to no greater than about 1.7.

In an exemplary embodiment, the first refractive index may be substantially the same as the second refractive index.

In an exemplary embodiment, both of the first refractive index and the second refractive index may be equal to about 1.4.

In an exemplary embodiment, the passivation layer may include silicon oxide and polypropylene glycol mono-propyl.

In an exemplary embodiment, the metal pattern may include at least one of aluminum (Al), gold (Au), silver (Ag), copper (Cu), chromium (Cr), iron (Fe), nickel (Ni), and their alloy.

In an exemplary embodiment, thicknesses of the protrusions may be greater than the widths of the protrusions.

In an exemplary embodiment, ratios of thickness over the widths of the protrusions may be from about 2 to about 4.

In an exemplary embodiment, the passivation layer may cover whole outer surfaces of the metal pattern.

In an exemplary embodiment, the passivation layer may include a plurality of air gaps among each of the protrusions.

In an exemplary embodiment, the air gaps may be spaced apart from side surfaces of the protrusions with a maximum distance and a minimum distance.

In an exemplary embodiment, ratios of the minimum distance over the maximum distance may be from about 0.2 to about 0.8.

In an exemplary embodiment, the passivation layer may cover whole upper surfaces and a portion of side surfaces of the protrusions.

In an exemplary embodiment, thicknesses of portions of the passivation layer which cover the side surfaces of the protrusions may be from greater than about zero to no greater than about 150 nanometers.

In an exemplary embodiment of the invention, a method of manufacturing a polarizer is provided. The method includes providing a metal layer on a substrate, patterning the metal layer to provide a metal pattern having a plurality of protrusions, and providing a passivation layer on the metal pattern to cover upper surfaces of the protrusions. The substrate has a first refractive index. The passivation layer has a second refractive index.

In an exemplary embodiment, the first refractive index may be from about 1.4 to about 1.7, and the second refractive index may be from greater than about zero to no greater than about 1.7.

In an exemplary embodiment, the providing the passivation layer may include spin-coating a material to form the passivation layer. The material may have the second refractive index.

In an exemplary embodiment, the providing the passivation layer may include laminating the passivation layer having the second refractive index.

According to an exemplary embodiment of the invention, a method of manufacturing a polarizer is provided. The method includes forming a metal layer on a substrate having a first refractive index from about 1.4 to about 1.7, forming a hard mask on the metal layer, forming a polymer layer comprising one of a thermosetting resin or a photocurable resin on the hard mask, contacting a mold including a plurality of protrusions having widths and spaced apart from each other on the polymer layer, applying a pressure on the mold toward the polymer layer to transfer the protrusions of the mold into the polymer layer to form a patterned polymer layer, solidifying the patterned polymer layer, removing the mold from the solidified patterned polymer layer, and removing a portion of the solidified patterned polymer layer to form a polymer pattern having the protrusions with the widths and spaced apart from each other.

In addition, the method further includes etching an exposed portion of the hard mask to expose a portion of the metal layer corresponding to valleys among the protrusions, etching the exposed portion of the metal layer to form a metal pattern on the substrate, removing a remaining portion of the polymer pattern and the hard mask from the metal pattern to form a wire grid metal pattern having the protrusions with the widths and spaced apart from each other and forming a passivation layer on the wire grid metal pattern to cover at least one surface of the protrusions. The passivation layer has a second refractive index which is from greater than about 0 to no greater than about 1.7.

According to a polarizer of exemplary embodiments of the invention and a method of manufacturing the same, refractive indices of a substrate on which a wire grid pattern is disposed and a passivation layer covering the wire grid pattern are adjusted to increase transmissivity of light toward a display panel.

Also, sizes and shapes of air gaps formed within the passivation layer are adjusted to increase light transmissivity of the wire grid polarizer.

BRIEF DESCRIPTION OF THE DRAWINGS

Exemplary embodiments of the invention can be understood in more detail from the following detailed description taken in conjunction with the accompanying drawings, in which.

DETAILED DESCRIPTION OF EXEMPLARY EMBODIMENTS

Figure 1:
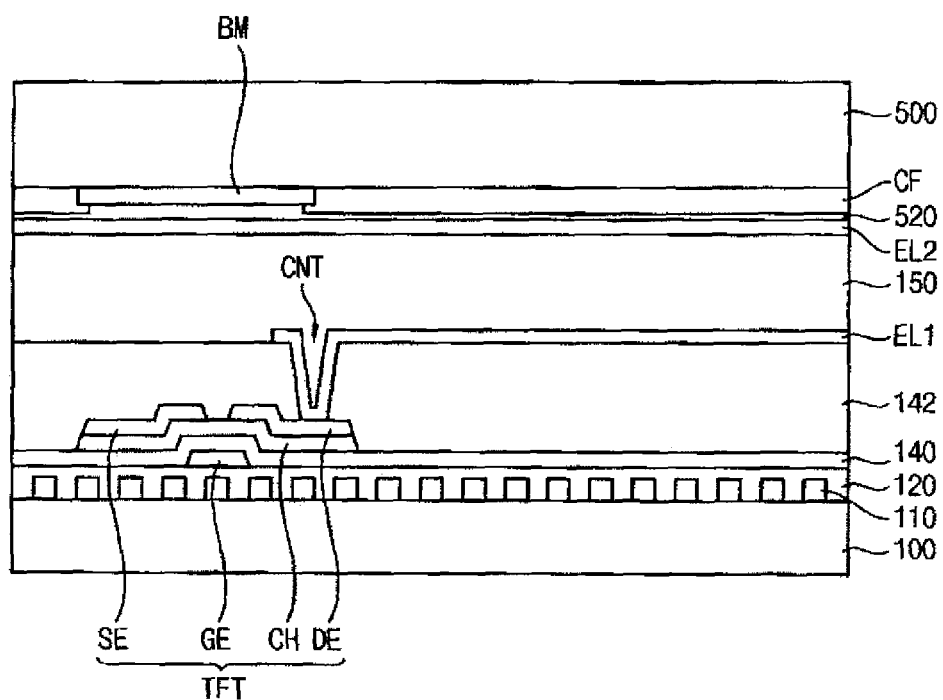
FIG. 1 is a cross-sectional view of a display panel according to an exemplary embodiment of the invention.

Hereinafter, exemplary embodiments of the invention will be described in further detail with reference to the accompanying drawings.

In the drawings, the thickness of layers, films, panels, regions, etc., may be exaggerated for clarity. It will be understood that when an element such as, for example, a layer, film, region, or substrate is referred to as being "on", "connected to" or "coupled to" another element, it can be directly on, connected to or coupled to the other element or intervening elements may also be present. Like reference numerals designate like elements throughout the specification.

As used herein, the singular forms, "a", "an", and "the" are intended to include plural forms as well, unless the context clearly indicates otherwise.

Figure 2:
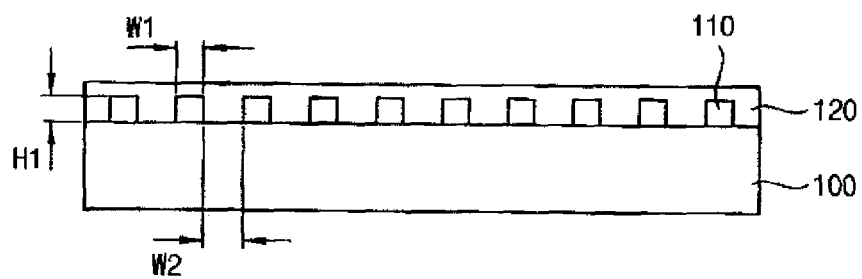
FIG. 2 is an enlarged cross-sectional view illustrating a polarizer of FIG. 1.

FIG. 1 is a cross-sectional view of a display panel according to an exemplary embodiment of the invention. FIG. 2 is an enlarged cross-sectional view illustrating a polarizer of FIG. 1.

Referring to FIGS. 1 and 2, a display panel according to the present embodiment includes an array substrate, a facing substrate, a liquid crystal layer 150 and a polarizer. However, exemplary embodiments of the invention are not limited to the display panel of FIG. 1. For example, alternatively, in an exemplary embodiment, the display panel may include an array substrate on which a black matrix BM and/or a color filter CF are disposed. Also the display panel may include, for example, another component substituting the black matrix BM and/or the color filter CF. Hereinafter, referring to the display panel of FIG. 1, each component of the display panel according to the present embodiment is described in detail.

The array substrate includes, for example, a first substrate 100, a first metal pattern 110, a first passivation layer 120, a gate insulation layer 140, a thin film transistor TFT, a protection insulation layer 142, and a first electrode ELL A polarizer according to the present embodiment includes, for example, the first substrate 100, the first metal pattern 110, and the first passivation layer 120.

The first substrate 100 may include a material having, for example, high transmissivity, high thermal resistance, and high chemical resistance. The first substrate 100 has a first refractive index. The first refractive index may be, for example, from about 1.4 to about 1.7. The first substrate 100 may be formed of, for example, transparent materials such as silicon oxide, polyethylene terephthalate, or glass. For example, the first substrate 100 may include silicon dioxide.

The first metal pattern 110 is disposed on the first substrate 100. For example, the first metal pattern 110 may include, for example, aluminum (Al), gold (Au), silver (Ag), copper (Cu), chromium (Cr), iron (Fe), nickel (Ni), palladium (Pd), platinum (Pt), tantalum (Ta), molybdenum (Mo), ruthenium (Ru), tungsten (W) or an alloy thereof. The first metal pattern 110 includes, for example, a plurality of protrusions having a first width W1 and a first thickness H1. The protrusions are, for example, spaced apart from each other with a first interval W2 to provide a wire grid pattern. The wire grid pattern may be disposed in a whole area or a part area of the array substrate. The wire grid pattern may be disposed, for example, parallel to or perpendicular to a gate line (not shown). Alternatively, the wire grid pattern may be, for example, tilted to a desired angle with respect to the gate line. The first thickness H1 of the protrusions may be, for example, greater than the first width W1 of the protrusions. For example, a ratio of the first thickness H1 over the first width W1 may be about 2 to about 4. For example, the ratio of the first thickness H1 over the first width W1 may be about 3.

A polarization ratio ("PR") of the first metal pattern is increased when the first width W1 and the first interval W2 of the protrusions are less than a wavelength of incident light. For example, when the incident light is visible light having a wavelength from about 400 nanometers to about 700 nanometers, the first width W1 and the first interval W2 of the protrusions should be less than about 400 nanometers. According to exemplary embodiments, the first width W1, the first thickness H1, and the first interval W2 may be about 50 nanometers, about 150 nanometers, and about 50 nanometers, respectively.

The first passivation layer 120 is disposed on the first substrate 100 on which the first metal pattern 110 is disposed. The first passivation layer 120 covers, for example, at least one surface of the first metal pattern 110. In the present embodiment, the first passivation layer 120 covers, for example, whole outer surfaces of the first metal pattern 110. The first passivation layer 120 has a second refractive index. The second refractive index may be, for example, from greater than about zero to no greater than about 1.4. According to embodiments, the first refractive index may be different from the second refractive index. Alternatively, the first refractive index may be substantially the same as the second refractive index. The first passivation layer 120 may include, for example, silica ink 123. The silica ink 123 may include, for example, silicon oxide, polypropylene glycol mono-propyl ("PGP"), ethanol, and water. For example, the silica ink 123 may include the silicon oxide, the PGP, the ethanol, and the water in amounts of about 21.5 wt %, about 73.5 wt %, about 3.2 wt %, and about 1.8 wt %, respectively. An increase in light transmissivity according to the first and the second refractive indices are described in detail referring to FIGS. 3A to 3D.

The gate electrode GE and the gate line are disposed on the first passivation layer 120. For example, in an exemplary embodiment, the gate electrode GE and the gate line may each be formed of one of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), ruthenium (Ru), cobalt (Co) and any mixtures or alloys thereof. The gate electrode GE and the gate line may be formed in, for example, a single layer.

The gate insulation layer 140 is disposed on the first passivation layer 120 on which the gate electrode GE and the gate line are disposed. The gate insulation layer 140 may include, for example, silicon oxide, silicon nitride, silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

The thin film transistor TFT includes, for example, the gate electrode GE, a channel layer CH, a source electrode SE, and a drain electrode DE.

The channel layer CH is overlapped with the gate electrode GE and is disposed on the gate insulation layer 140. The channel layer CH may include, for example, a semiconductor layer having an amorphous silicon ("a-Si:H") and a resistive contact layer having an n+ amorphous silicon ("n+ a-Si:H"). Also, the channel layer CH may include, for example, an oxide semiconductor material. The oxide semiconductor material may include amorphous oxide having, for example, indium (In), zinc (Zn), gallium (Ga), or tin (Sn). For example, in an exemplary embodiment, the channel layer CH may be formed of one of zinc oxide (ZnO), indium oxide ($In_2O_3$), gallium oxide ($Ga_2O_3$), tin oxide (SnO), Indium-Zinc-Oxide (IZO), Indium-Tin Oxide (ITO), Gallium-Indium-Zinc Oxide (GIZO), or hafnium-indium zinc-oxide (HfInZnO).

The source electrode SE and the drain electrode DE are disposed on the channel layer CH. The source electrode SE is electrically connected to a data line (not shown). The drain electrode DE is electrically connected to the first electrode EL1 via a contact hole CNT. For example, in an exemplary embodiment, the source electrode SE and the drain electrode DE may each be formed of one of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), ruthenium (Ru), cobalt (Co) and any mixtures or alloys thereof. The source electrode SE and the drain electrode DE may be formed, for example, in a single layer.

The protection insulation layer 142 is disposed on the gate insulation layer 140 on which the thin film transistor TFT is disposed. The protection insulation layer 142 may include, for example, silicon oxide, silicon nitride, or organic materials. The protection insulation layer 142 has the contact hole CNT exposing a portion of the drain electrode DE.

The facing substrate includes, for example, opposing substrate 500, a black matrix BM, a color filter CF, an overcoating layer 520, and a second electrode EL2.

The opposing 500 faces the first substrate 100. The opposing substrate 500 may include, for example, silicon oxide, polyethylene terephthalate, or glass.

The black matrix BM is disposed under the opposing substrate 500. The black matrix BM corresponds to boundaries of pixel areas and blocks light from the liquid crystal layer 150. For example, the black matrix BM may be overlapped with the data line, the gate line, and the thin film transistor TFT.

The color filter CF is disposed under the opposing substrate 500 on which the black matrix BM is disposed. The color filter CF may transmit or reflect the light from the liquid crystal layer 150 according to wavelengths of the light. For example, the color filter CF may include red color filter, green color filter, and blue color filter. The red, green, and blue color filters may be arranged sequentially corresponding to the pixel areas.

The overcoating layer 520 is disposed under the opposing substrate 500 on which the black matrix BM and the color filter CF are disposed. The overcoating layer 520 flattens the color filter CF and the black matrix BM to protect the color filter CF. For example, the overcoating layer 520 may include organic materials such as acryl, epoxy, polyimide, polyimide, benzocyclobutene (BCB), and phenolic resin.

The second electrode EL2 is disposed under the overcoating layer 520 corresponding to the pixel areas. The first electrode EL1 and the second electrode EL2 are formed of, for example, transparent conductive materials. For example, the first electrode EL1 and the second electrode EL2 may include indium tin oxide ("ITO"), indium zinc oxide ("IZO"), aluminum zinc oxide (AZO), or cadmium tin oxide (CTO).

The liquid crystal layer 150 is disposed between the array substrate (e.g., the first substrate 100) and the facing substrate (e.g., the opposing substrate 500). Liquid crystals in the liquid crystal layer 150 are arranged according to electric fields formed by the first electrode EL1 and the second electrode EL2 to have desired tilted angles. The arranged liquid crystals may transmit or block light incident on the liquid crystal layer 150. The display panel displays an image by adjusting the light amount by the liquid crystal layer 150.

As mentioned above, the display panel of FIG. 1 including a polarizer is shown as an exemplary embodiment of the invention, but exemplary embodiments of the invention are not limited to the display panel including the polarizer of FIG. 1. The display panel may include another component other than that of FIG. 1.

FIGS. 3A to 3D are graphs illustrating light transmissivity according to refractive indices of the polarizer of FIG. 2. More particularly, FIGS. 3A to 3D are graphs illustrating transmissivity of light through the polarizer according to refractive indices of the first passivation layer 120 when the refractive index of the first passivation layer is about 1.4, about 1.5, about 1.6, and about 1.7, respectively. In FIGS. 3A to 3D, a horizontal axis represents wavelengths of the light. Also, in FIGS. 3A to 3D, a reference light transmissivity ("Ref. polarizer") is illustrated.

Figure 3A:
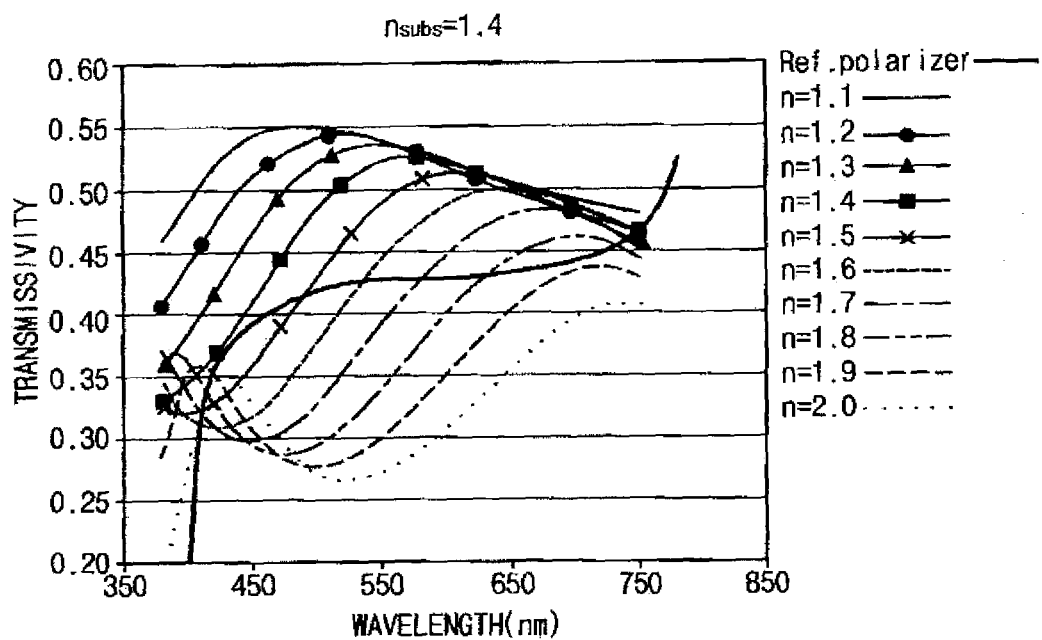
FIGS. 3A to 3D are graphs illustrating light transmissivity according to refractive indices of the polarizer of FIG. 2.

Referring to FIG. 3A, when the refractive index of the first substrate 100 is equal to about 1.4, and when the refractive index of the first passivation layer 120 is from greater than about zero to no greater than about 1.4, then the transmissivity of light having wavelengths of visible light (e.g., from about 400 nanometers to about 700 nanometers) used in the display panel is greater than the reference light transmissivity. Accordingly, when the refractive index of the first substrate 100 is equal to about 1.4, and when the refractive index of the first passivation layer 120 is no greater than about 1.4, the light transmissivity of the polarizer is increased.

Figure 3B:
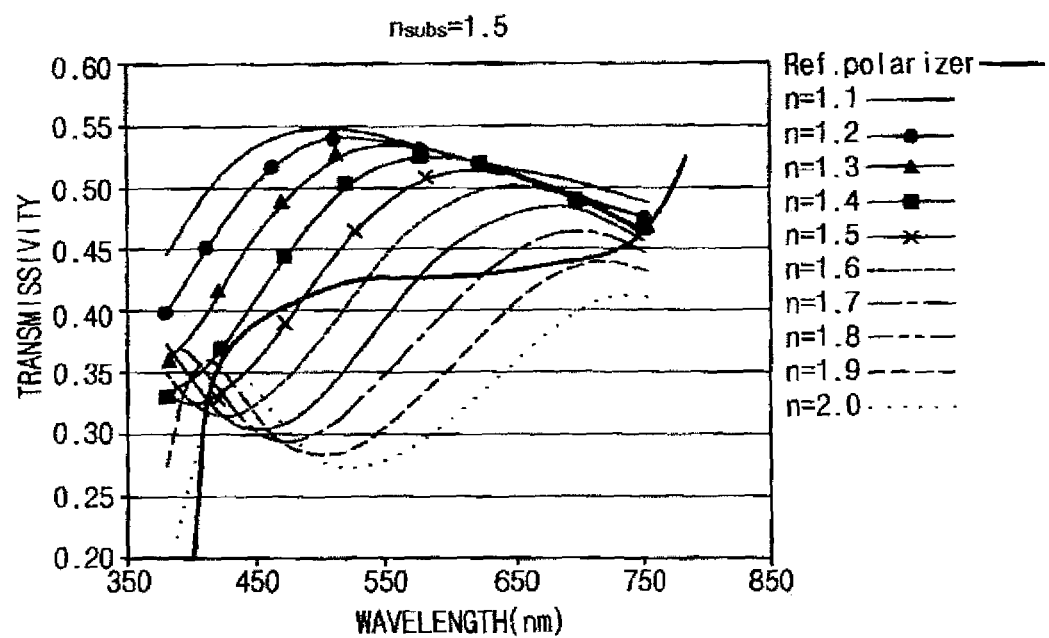
Figure 3C:
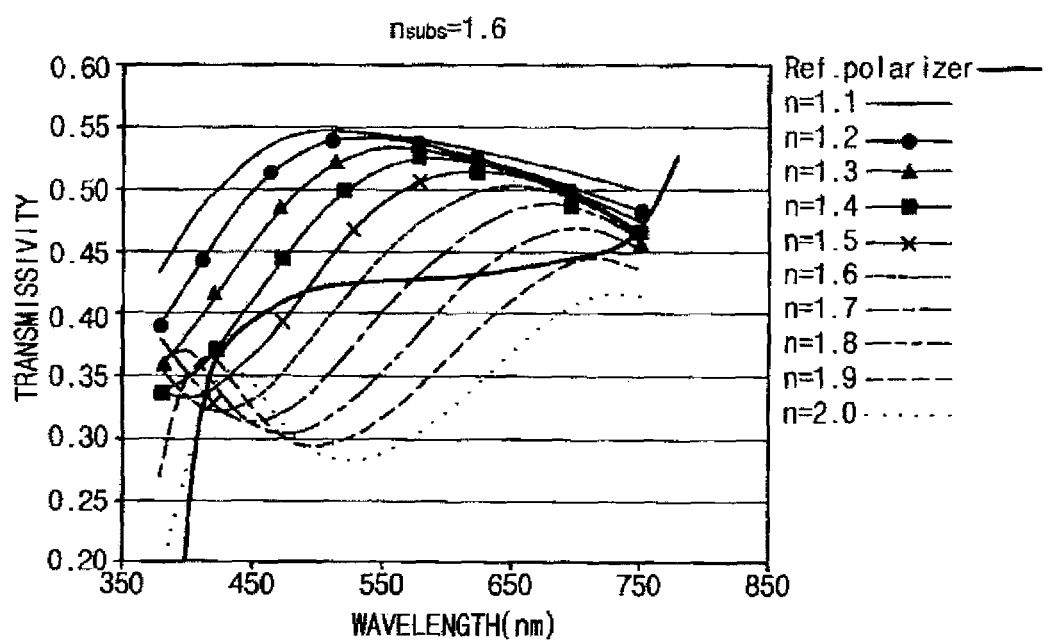
Figure 3D:
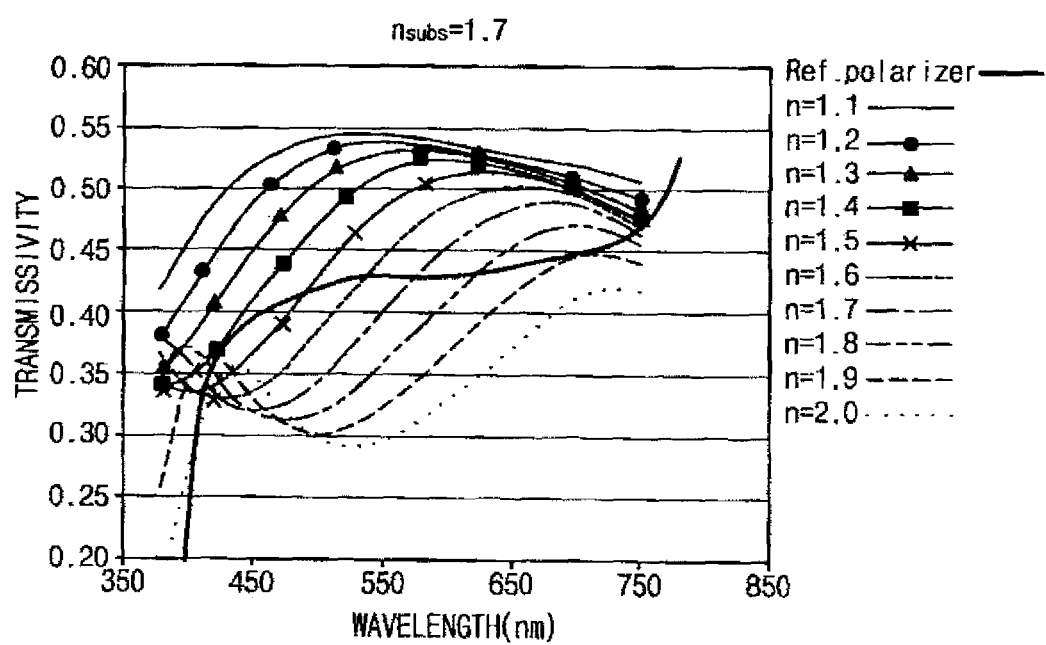

Referring to FIGS. 3B to 3D, when the refractive index of the first substrate 100 is about 1.5, about 1.6, and about 1.7, respectively, and when the refractive index of the first passivation layer 120 is from greater than about zero to no greater than about 1.4, then the transmissivity of the light having wavelengths of visible light is greater than the reference light transmissivity. That is, when the refractive index of the first substrate 100 is from about 1.4 to about 1.7, and when the refractive index of the first passivation layer 120 is from greater than about zero to no greater than about 1.4, then the light transmissivity of the polarizer is increased.

As mentioned above, the polarizer according to the present embodiment may increase the transmissivity of incident light by adjusting refractive indices of the substrate on which the wire grid pattern is disposed and the passivation layer covering the wire grid pattern.

FIGS. 4A to 4I are cross-sectional views illustrating a method of manufacturing the polarizer of FIG. 2.

Figure 4A:
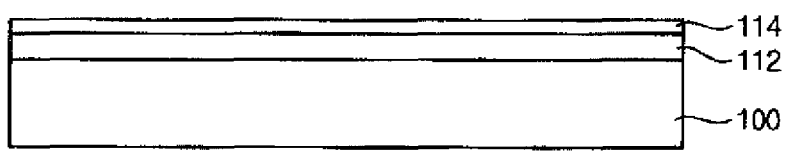
FIGS. 4A to 4I are cross-sectional views illustrating a method of manufacturing the polarizer of FIG. 2.

Referring to FIG. 4A, a metal layer 112 is formed on the first substrate 100. The first substrate 100 has a first refractive index. The first refractive index may be, for example, from about 1.4 to about 1.7. For example, the first substrate 100 may include glass, polyethylene terephthalate, or polyacryl. The metal layer 112 may include, for example, Al, Au, Ag, Cu, Cr, Fe, Ni, Pd, Pt, Ta, Mo, Ru, W or an alloy thereof. The metal layer 112 may be formed on the first substrate 110 using, for example, a deposition method such as chemical vapor deposition. A thickness of the metal layer 112 may be, for example, from about 100 nanometers to about 200 nanometers. The thickness of the metal layer 112 may be determined according to required widths when providing the wire grid pattern. That is, the metal layer 112 may have a desired thickness by considering a grid interval of the wire grid pattern which increases the polarization ratio. For example, when the width of the wire grid pattern should be equal to about 50 nanometers, then the metal layer 112 may be formed to have thickness of about 150 nanometers.

A hard mask 114 is formed on the metal layer 112. For example, the hard mask 114 may include a silicon oxide such as silicon dioxide. The hard mask 114 may be formed by, for example, chemical vapor deposition.

Figure 4B:
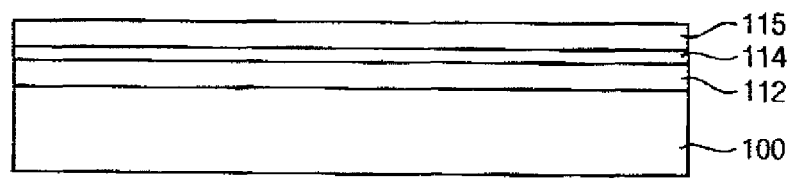

Referring to FIG. 4B, a polymer layer 115 is formed on the hard mask 114. The polymer layer 115 may include, for example, a thermosetting resin or a photocurable resin. For example, the thermosetting resin may include a urea resin, a melamine resin, or a phenol resin. For example, the photocurable resin may include a photopolymerization initiator, a surfactant, or an antioxidant.

Figure 4C:
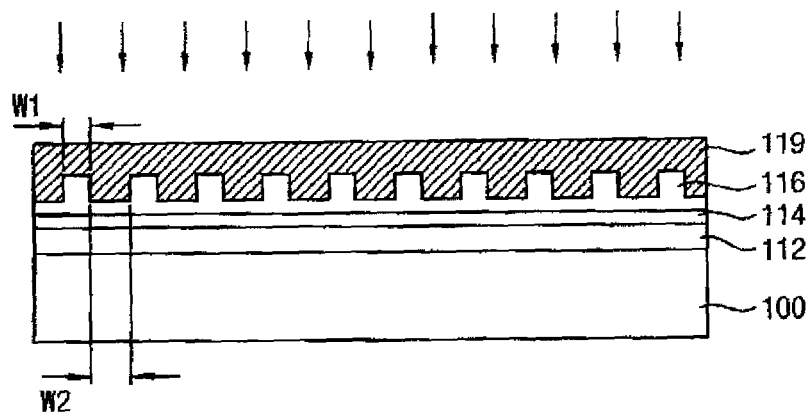

Referring to FIG. 4C, a mold 119 is contacted on the polymer layer 115 and a pressure is applied on the mold 119 toward the polymer layer 115 to pattern the polymer layer 115. The mold 119 may have, for example, protrusions having a desired width W2 and spaced apart from each other with a desired interval W1. Accordingly, the patterned polymer layer 116 may have protrusions having, for example, a first width W1 and spaced apart from each other with a first interval W2. For example, the first width W1 and the first interval W2 may be from about 30 nanometers to about 60 nanometers. For example, both of the first width W1 and the first interval W2 may be equal to about 50 nanometers.

When the polymer layer 115 includes the thermosetting resin, then the mold 119 may include, for example, metal or materials having a low coefficient of thermal expansion. In this case, after the mold 119 is contacted with the polymer layer 115, the polymer layer 115 is heated to a temperature higher than a glass transition temperature of the thermosetting resin, to provide fluidity. Then, the pressure is applied on the mold 119 toward the polymer layer 115 to transfer the protrusions of the mold 119 into the polymer layer 115. And then, the patterned polymer layer 116 is cooled to a temperature lower than the glass transition temperature, to solidify the patterned polymer layer 116.

On the other hand, when the polymer layer 115 includes the photocurable resin, then the mold 119 may include, for example, a transparent polymer material or materials having high light transmissivity and solidity. For example, in this case, after the mold 119 is contacted with the polymer layer 115, the pressure is applied on the mold 119 toward the polymer layer 115 to transfer the protrusions of the mold 119 into the polymer layer 115. And then, the patterned polymer layer 116 is illuminated through the mold 119 having high light transmissivity, to solidify the patterned polymer layer 116.

Figure 4D:
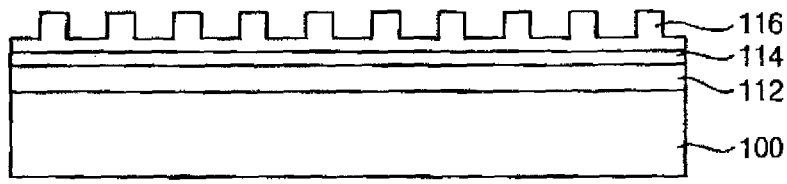

Referring to FIG. 4D, the mold 119 is removed from the solidified polymer layer 116. The solidified polymer layer 116 has, for example, a plurality of protrusions having the first width W1 and spaced apart from each other with the first interval W2. According to embodiments, the first width W1 and the first interval W2 may be adjusted by modifying a shape of the mold 119.

Figure 4E:
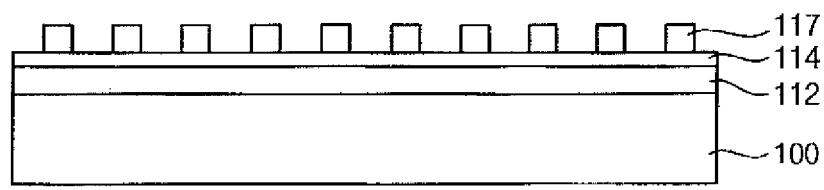

Referring to FIG. 4E, a portion of the solidified polymer layer 116 is removed to form a polymer pattern 117 having the protrusions. For example, when the solidified polymer layer 116 is dry-etched, then the hard mask 114 corresponding to valleys among the protrusions is exposed, and the polymer pattern 117 is formed therefrom.

Figure 4F:

Referring to FIG. 4F, the exposed portion of the hard mask 114 is etched to expose the metal layer 112 corresponding to the valleys among the protrusions, and then the exposed portion of the metal layer 112 is etched to form a first metal pattern 110. The first metal pattern 110 has the first width W1 and the first interval W2.

Figure 4G:
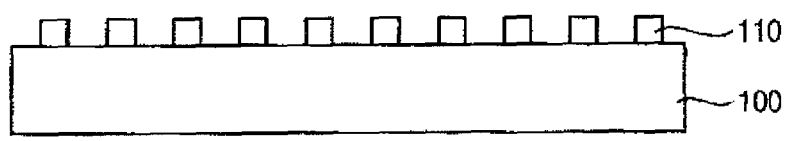

Referring to FIG. 4G, the polymer pattern 117 and the hard mask 114 both remaining on the first metal pattern 110 are removed to form the wire grid pattern.

Figure 4H:
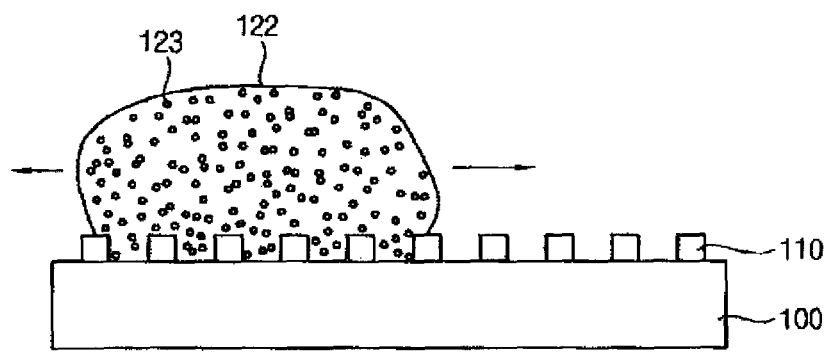

Referring to FIG. 4H, a passivation material 122 is disposed on the first substrate 100 on which the first metal pattern 110 is disposed. The passivation material 122 has a second refractive index. The second refractive index may be, for example, from greater than about zero to no greater than about 1.4. For example, the passivation material 122 may include silica ink 123. The silica ink 123 may include, for example, silicon oxide, polypropylene glycol mono-propyl ("PGP"), ethanol, and water. For example, the silica ink 123 may include the silicon oxide, the PGP, the ethanol, and the water in amounts of about 21.5 wt %, about 73.5 wt %, about 3.2 wt %, and about 1.8 wt %, respectively.

Figure 4I:
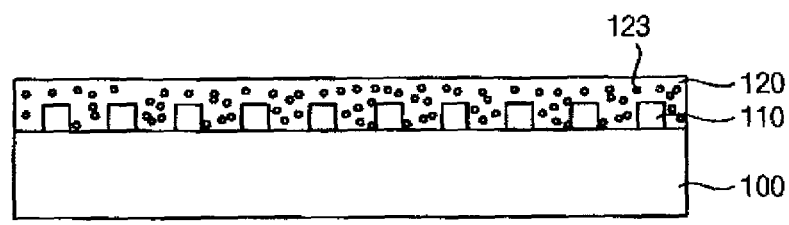

Referring to FIG. 4I, the passivation material 122 is, for example, spin-coated to form a first passivation layer 120. The first passivation layer 120 covers, for example, at least one surface of the first metal pattern 110. In the present embodiment, the first passivation layer 120 covers, for example, whole outer surfaces of the first metal pattern 110. The first passivation layer 120 includes, for example, the silica ink 123 and has the second refractive index. The second refractive index of the first passivation layer 120 may be different from the refractive index of the first substrate 100. Alternatively, the second refractive index of the first passivation layer 120 may be substantially the same as the refractive index of the first substrate 100.

Figure 5:
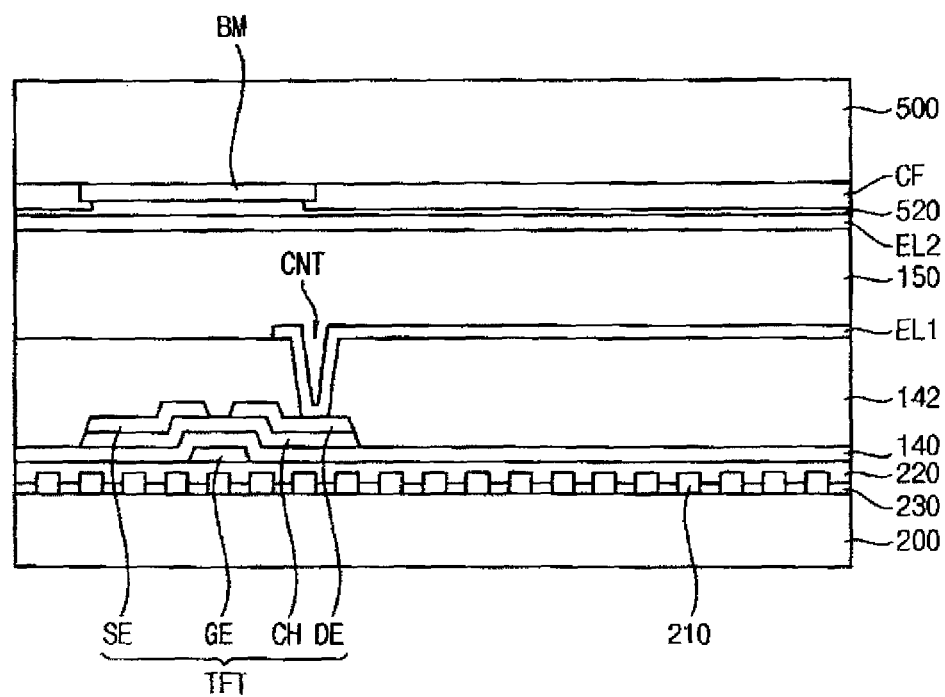
FIG. 5 is a cross-sectional view of a display panel according to an exemplary embodiment of the invention.
Figure 6:
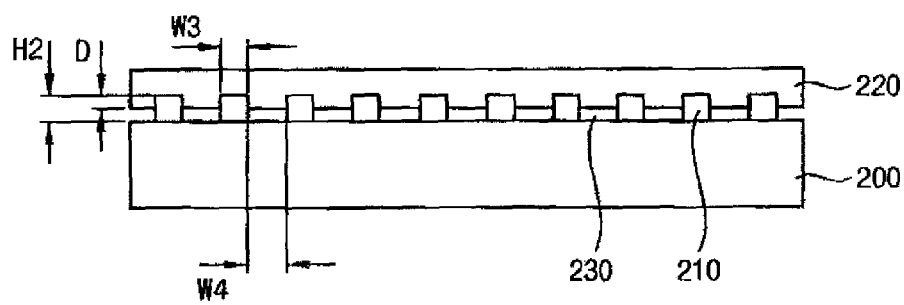
FIG. 6 is an enlarged cross-sectional view illustrating a polarizer of FIG. 5.

FIG. 5 is a cross-sectional view of a display panel according to an exemplary embodiment of the invention. FIG. 6 is an enlarged cross-sectional view illustrating a polarizer of FIG. 5.

Referring to FIGS. 5 and 6, the display panel of FIGS. 5 and 6 is substantially the same as the display panel of FIGS. 1 and 2 except that the display panel of FIGS. 5 and 6 includes a second substrate 200, a second metal pattern 210, air gaps 230, and a second passivation layer 220. Accordingly, a detailed description of the identical elements is omitted.

The display panel includes a polarizer. The polarizer includes, for example, the second substrate 200, the second metal pattern 210, the air gaps 230, and the second passivation layer 220.

The second substrate 200 may include materials having, for example, high transmissivity, high thermal resistance, and high chemical resistance. The second substrate 200 has a third refractive index. The third refractive index may be, for example, from about 1.4 to about 1.7. The second substrate 200 may be formed of transparent materials such as, for example, silicon oxide, polyethylene terephthalate, or glass. For example, the second substrate 200 may include silicon dioxide.

The second metal pattern 210 is disposed on the second substrate 200. For example, the second metal pattern 210 may include Al, Au, Ag, Cu, Cr, Fe, Ni, Pd, Pt, Ta, Mo, W or an alloy thereof. The second metal pattern 210 includes, for example, a plurality of protrusions having a second width W3 and a second thickness H2. The protrusions are, for example, spaced apart from each other with a second interval W4 to provide a wire grid pattern. The wire grid pattern may be disposed in a whole area or a part area of the array substrate. The wire grid pattern may be, for example, disposed parallel to or perpendicular to a gate line (not shown). Alternatively, the wire grid pattern may be, for example, tilted to a desired angle with respect to the gate line. The second thickness H2 of the protrusions may be, for example, greater than the second width W3 of the protrusions. For example, a ratio of the second thickness H2 over the second width W3 may be from about 2 to about 4. For example, the ratio of the second thickness H2 over the second width W3 may be equal to about 3.

A polarization ratio ("PR") of the second metal pattern 210 is increased when the second width W3 and the second interval W4 of the protrusions are less than a wavelength of incident light. For example, when the incident light is visible light having a wavelength from about 400 nanometers to about 700 nanometers, the second width W3 and the second interval W4 of the protrusions should be less than about 400 nanometers. For example, both the second width W3 and the second interval W4 may be no greater than about 100 nanometers. According to exemplary embodiments, the second width W3, the second thickness H2, and the second interval W4 may be about 50 nanometers, about 150 nanometers, and about 50 nanometers, respectively.

The second passivation layer 220 is disposed on the second substrate 200 on which the second metal pattern 210 is disposed. The second passivation layer 220 covers, for example, at least one surface of the second metal pattern 210. In the present embodiment, the second passivation layer 220 covers, for example, upper surfaces and a portion of side surfaces of the second metal pattern 210. That is, for example, a plurality of air gaps 230 increasing light transmissivity of the polarizer are present among protrusions between the second substrate 200 and the second passivation layer 220. The air gaps 230 are sealed by the second substrate 200, the second metal pattern 210, and the second passivation layer 220. Sizes of the air gaps 230 are determined according to a covering thickness D of the second passivation layer 220. The covering thickness D of the second passivation layer 220 is the thickness of the second passivation layer 220 which partially covers the side surfaces of the second metal pattern 210. That is, as the covering thickness D of the second passivation layer 220 which covers the side surfaces of the second metal pattern 210 is increased, the sizes of the air gaps 230 are reduced.

In the present embodiment, the second passivation layer 220 has a fourth refractive index. The fourth refractive index may be, for example, from about 1.5 to about 1.7. According to embodiments, the third refractive index may be different from the fourth refractive index. Alternatively, the third refractive index may be substantially the same as the fourth refractive index. The second passivation layer 220 may include, for example, a photosensitive dry film. For example, the second passivation layer 220 may include polyethylene terephthalate. An increase in light transmissivity according to the third refractive index, the fourth refractive index, and the sizes of the air gaps are described in detail referring to FIGS. 7A to 7C.

Figure 7A:
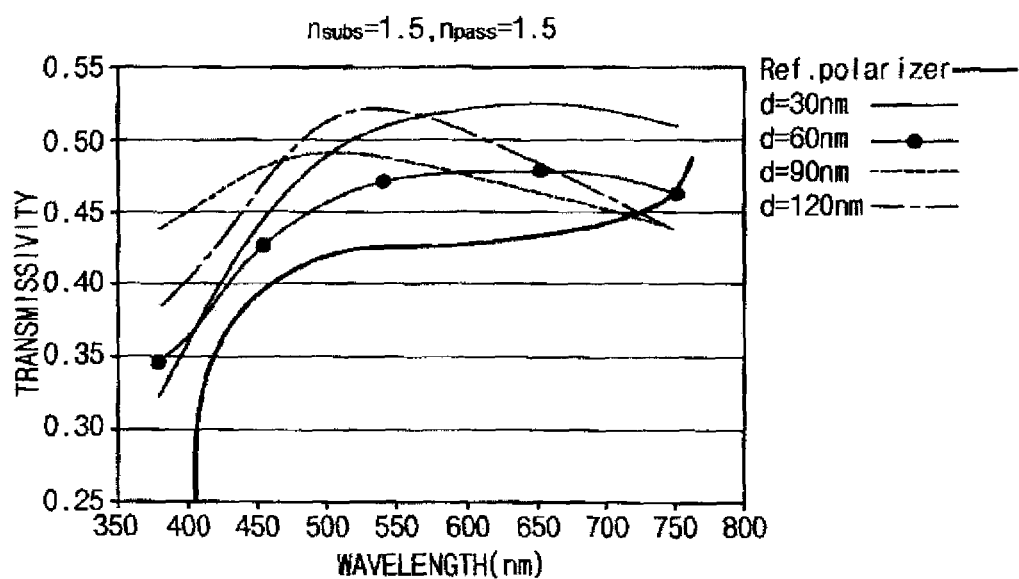
FIGS. 7A to 7C are graphs illustrating light transmissivity according to thicknesses of a portion of a metal pattern covered by a passivation layer of the polarizer of FIG. 6.
Figure 7B:
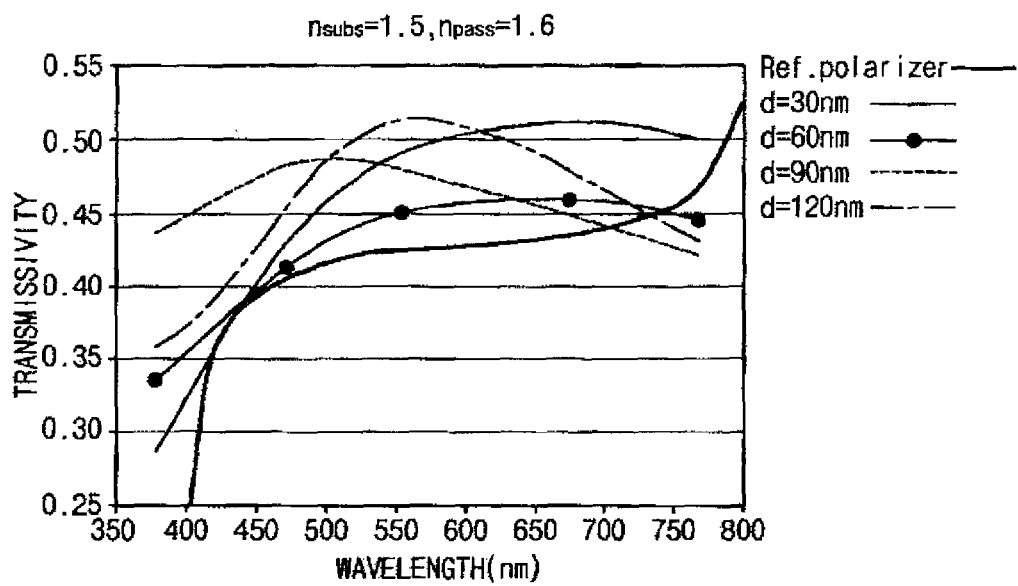
Figure 7C:
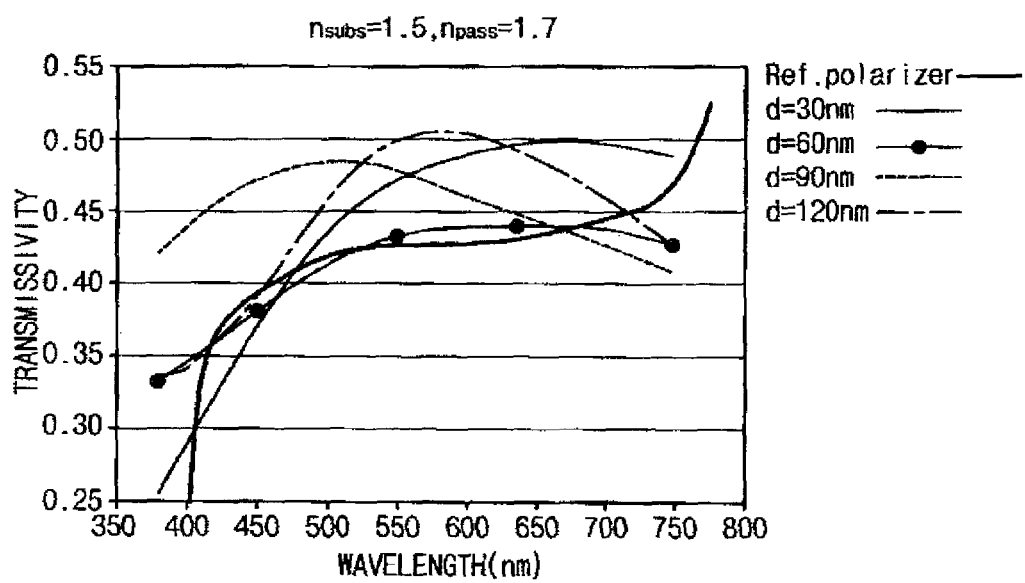

FIGS. 7A to 7C are graphs illustrating light transmissivity according to thicknesses of a metal pattern covered by a passivation layer of the polarizer of FIG. 6. More particularly, FIGS. 7A to 7C are graphs illustrating the transmissivity of light through the polarizer according to the covering thickness D of the second passivation layer 220 covering the second metal pattern 210 when the refractive index of the second substrate 200 is about 1.5, and when the refractive index of the second passivation layer 220 is about 1.5, about 1.6, and about 1.7, respectively. In FIGS. 7A to 7C, the second thickness H2 of the second metal pattern 210 is about 150 nanometers. In FIGS. 7A to 7C, a horizontal axis represents wavelengths of the light. Also, in FIGS. 7A to 7C, a reference light transmissivity ("Ref. polarizer") is illustrated.

Referring to FIG. 7A, when refractive indices of both the second substrate 200 and the second passivation layer 220 are about 1.5, the transmissivity of light having a wavelength of visible light (e.g., from about 400 nanometers to about 700 nanometers) used in the display panel is greater than the reference light transmissivity if the covering thickness D of the second passivation layer 220 covering the second metal pattern 210 is no greater than about 120 nanometers. Accordingly, when the refractive indices of both the second substrate 200 and the second passivation layer 220 are about 1.5, and when heights of the air gaps 230 between the second substrate 200 and the second passivation layer 220 are greater than about 30 nanometers, then the light transmissivity of the polarizer is increased.

Referring to FIG. 7B, when refractive index of the second substrate 200 is about 1.5, and when refractive index of the second passivation layer 220 is about 1.6, the transmissivity of light having wavelength of visible light is greater than the reference light transmissivity if the covering thickness D of the second passivation layer 220 covering the second metal pattern 210 is no greater than about 120 nanometers. Accordingly, when the refractive index of the second substrate 200 is about 1.5 and the refractive index of the second passivation layer 220 is about 1.6, and when heights of the air gaps 230 between the second substrate 200 and the second passivation layer 220 are greater than about 30 nanometers, then the light transmissivity of the polarizer is increased.

Referring to FIG. 7C, when refractive index of the second substrate 200 is about 1.5, and when refractive index of the second passivation layer 220 is about 1.7, the transmissivity of light having a wavelength of visible light is greater than the reference light transmissivity if the covering thickness D of the second passivation layer 220 covering the second metal pattern 210 is from about 90 nanometers to about 120 nanometers. Accordingly, when the refractive index of the second substrate 200 is about 1.5 and the refractive index of the second passivation layer 220 is about 1.7, and when heights of the air gaps 230 between the second substrate 200 and the second passivation layer 220 are from about 30 nanometers to about 60 nanometers, then the light transmissivity of the polarizer is increased.

As mentioned above, the polarizer according to the present embodiment may increase the transmissivity of incident light by adjusting refractive indices of the substrate on which the wire grid pattern is disposed and the passivation layer covering the wire grid pattern, and by adjusting sizes of air gaps between the substrate and the passivation layer.

Figure 8A:
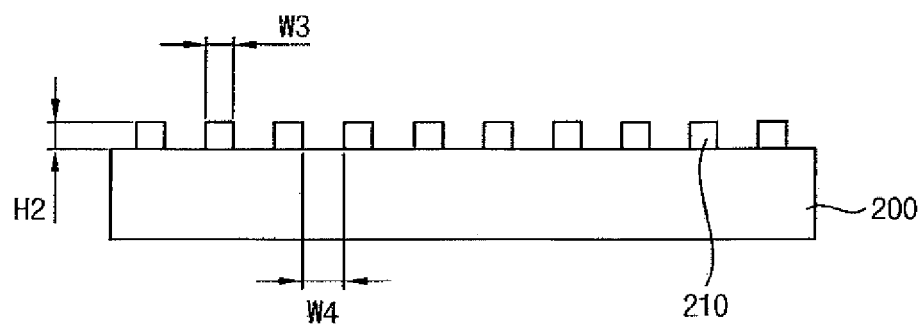
FIGS. 8A to 8C are cross-sectional views illustrating a method of manufacturing the polarizer of FIG. 6.
Figure 8B:
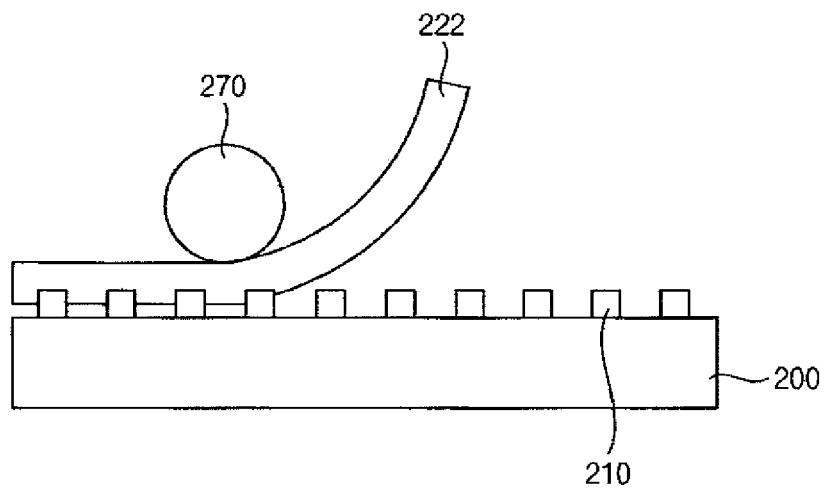
Figure 8C:
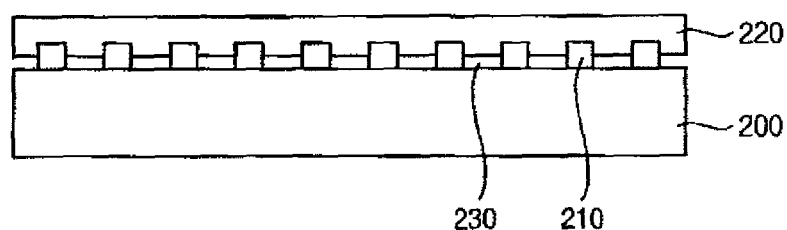

FIGS. 8A to 8C are cross-sectional views illustrating a method of manufacturing the polarizer of FIG. 6.

Manufacturing processes to provide the second metal pattern 210 on the second substrate 200 are substantially the same as the manufacturing processes illustrated in FIGS. 4A to 4G. Thus, a detailed description of the identical processes is omitted.

Referring to FIG. 8A, the second metal pattern 210 is formed on the second substrate 200. The second substrate 200 has a third refractive index. The third refractive index may be, for example, from about 1.4 to about 1.7. For example, the second substrate 200 may include glass, polyethylene terephthalate, or polyacryl. The second metal pattern 210 may include, for example, Al, Au, Ag, Cu, Cr, Fe, Ni, Pd, Pt, Ta, Mo, Ru, W or an alloy thereof. The second metal pattern 210 may have, for example, a plurality of protrusions having a second width W3 and a second thickness H2 while spaced apart from each other with second interval W4. For example, the second thickness H2 may be equal to about 150 nanometers.

Referring to FIG. 8B, a passivation film 222 is, for example, laminated using a roll printer 270 on the second substrate 200 on which the second metal pattern 210 is disposed. The passivation film 222 has a fourth refractive index. The fourth refractive index may be, for example, from about 1.5 to about 1.7. According to embodiments, the third refractive index may be different from the fourth refractive index. Alternatively, the third refractive index may be substantially the same as the fourth refractive index. The passivation film 222 may include, for example, a photosensitive dry film. For example, the passivation film 222 may include polyethylene terephthalate.

The passivation film 222 is, for example, laminated on the second metal pattern 210 to cover a desired thickness of protrusions of the second metal pattern 210 by pressure of the roll printer 270. The covering thickness D of the passivation film 222 covering the second metal pattern 210 may be adjusted by, for example, the pressure of the roll printer 270. As the passivation film 222 is laminated on the second metal pattern 210, a plurality of air gaps having desired sizes are formed among the protrusions between the second substrate 200 and the passivation film 222. For example, heights of the air gaps may be from about 30 nanometers to about 120 nanometers.

Referring to FIG. 8C, the second passivation layer 220 is formed on the second substrate 200 on which the second metal pattern 210 is disposed, to provide the plurality of air gaps 230. Although not shown, the second substrate 200 on which the second passivation layer 220 is formed may be, for example, heated or illuminated in further processes.

Figure 9:
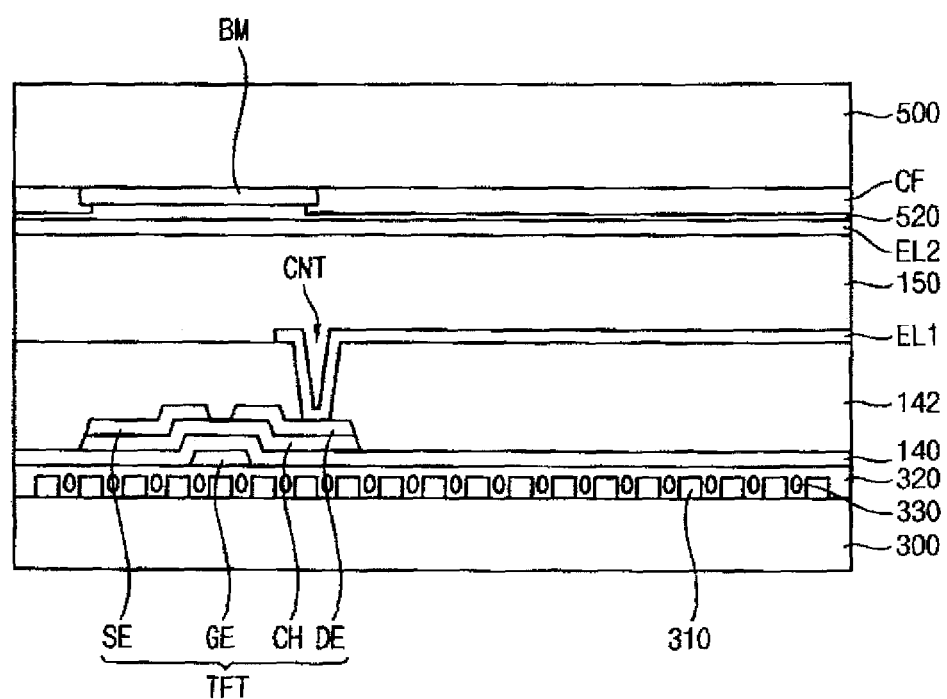
FIG. 9 is a cross-sectional view of a display panel according to an exemplary embodiment of the invention.
Figure 10:
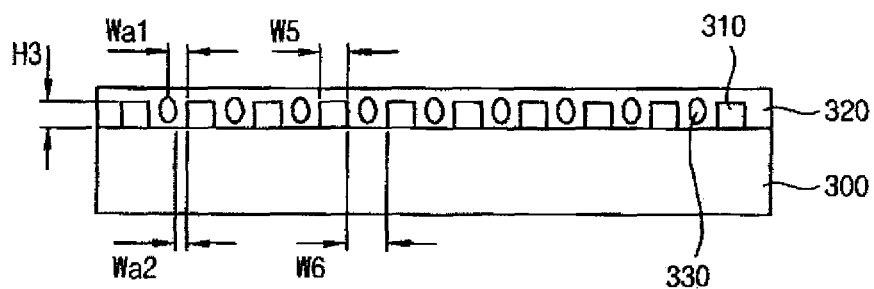
FIG. 10 is an enlarged cross-sectional view of a polarizer of FIG. 9.

FIG. 9 is a cross-sectional view of a display panel according to an exemplary embodiment of the invention. FIG. 10 is an enlarged cross-sectional view of a polarizer of FIG. 9.

Referring to FIGS. 9 and 10, the display panel of FIGS. 9 and 10 is substantially the same as the display panel of FIGS. 1 and 2 except that the display panel of FIGS. 9 and 10 includes a third substrate 300, a third metal pattern 310, air gaps 330, and a third passivation layer 320. Accordingly, a detailed description of the identical elements is omitted.

The display panel includes a polarizer. The polarizer includes, for example, the third substrate 300, the third metal pattern 310, the air gaps 330, and the third passivation layer 320.

The third substrate 300 may include materials having, for example, high transmissivity, high thermal resistance, and high chemical resistance. The third substrate 300 has a fifth refractive index. The fifth refractive index may be, for example, from about 1.4 to about 1.7. The third substrate 300 may be formed of, for example, transparent materials such as silicon oxide, polyethylene terephthalate, or glass. For example, the third substrate 300 may include silicon dioxide.

The third metal pattern 310 is disposed on the third substrate 300. For example, the third metal pattern 310 may include Al, Au, Ag, Cu, Cr, Fe, Ni, Pd, Pt, Ta, Mo, Ru, W or an alloy thereof. The third metal pattern 310 includes, for example, a plurality of protrusions having a third width W5 and a third thickness H3. The protrusions are, for example, spaced apart from each other with a third interval W6 to provide a wire grid pattern. The wire grid pattern may be disposed, for example, in a whole area or a part area of the array substrate. The wire grid pattern may be disposed, for example, parallel to or perpendicular to a gate line (not shown). Alternatively, the wire grid pattern may be, for example, tilted to a desired angle with respect to the gate line. The third thickness H3 of the protrusions may be, for example, greater than the third width W5 of the protrusions. For example, a ratio of the third thickness H3 over the third width W5 may be from about 2 to about 4. For example, the ratio of the third thickness H3 over the third width W5 may be about 3.

A polarization ratio ("PR") of the third metal pattern 310 is increased when the third width W5 and the third interval W6 of the protrusions are, for example, less than a wavelength of incident light. For example, when the incident light is visible light having a wavelength from about 400 nanometers to about 700 nanometers, the third width W5 and the third interval W6 of the protrusions should be less than about 400 nanometers. For example, both the third width W5 and the third interval W6 may be no greater than about 100 nanometers. According to exemplary embodiments, the third width W5, the third thickness H3, and the third interval W6 may be, for example, about 50 nanometers, about 150 nanometers, and about 50 nanometers, respectively.

The third passivation layer 320 is disposed on the third substrate 300 on which the third metal pattern 310 is disposed. The third passivation layer 320 covers, for example, at least one surface of the third metal pattern 310. In the present embodiment, the third passivation layer 320 covers, for example, whole outer surfaces of the third metal pattern 310. Furthermore, a plurality of air gaps 330 increasing light transmissivity of the polarizer are present among protrusions between the third substrate 300 and the third passivation layer 320. Each of the air gaps 330 has, for example, a maximum distance Wa1 and a minimum distance Wa2 from adjacent protrusions. Although the air gaps shown in FIGS. 9 and 10 have an elliptical cross-sectional shape having a long vertical length and a short horizontal length, the shapes of the air gaps of exemplary embodiments are not limited thereto. According to exemplary embodiments, the cross-sectional shape of the air gaps 330 may be, for example, substantially triangular or rectangular. The air gaps 330 are sealed within the third passivation layer 320. The air gaps 330 may be formed when the third passivation layer 320 is deposited on the third metal pattern 310.

In the present embodiment, the third passivation layer 320 has a sixth refractive index. The sixth refractive index may be, for example, from about 1.4 to about 1.6. According to embodiments, the fifth refractive index may be different from the sixth refractive index. Alternatively, the fifth refractive index may be substantially the same as the sixth refractive index. An increase in light transmissivity according to the fifth refractive index, the sixth refractive index, and the sizes of the air gaps are described in detail referring to FIGS. 11A to 11C.

Figure 11A:
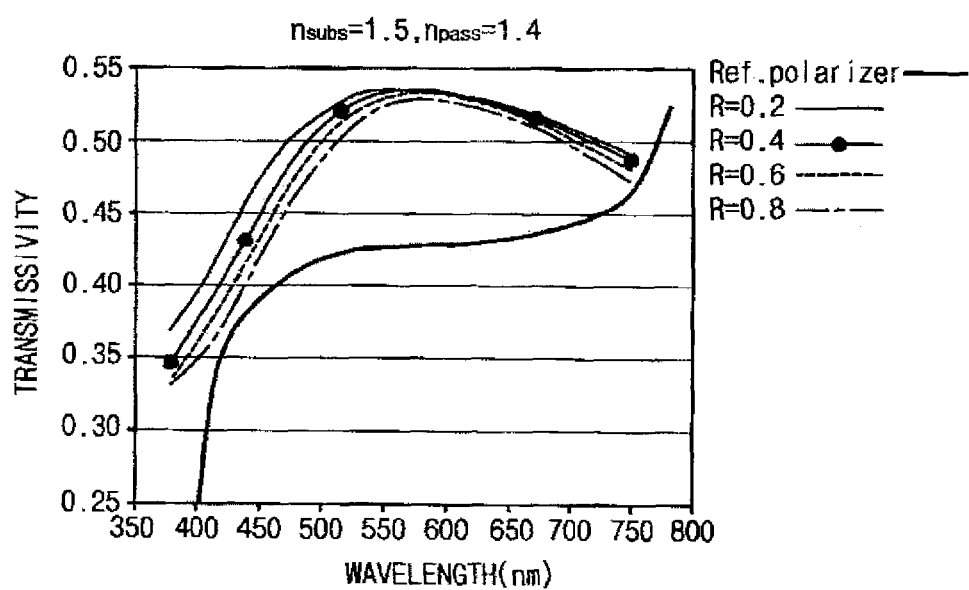
FIGS. 11A to 11C are graphs illustrating light transmissivity according to sizes of air gaps in a passivation layer of the polarizer of FIG. 10.
Figure 11B:
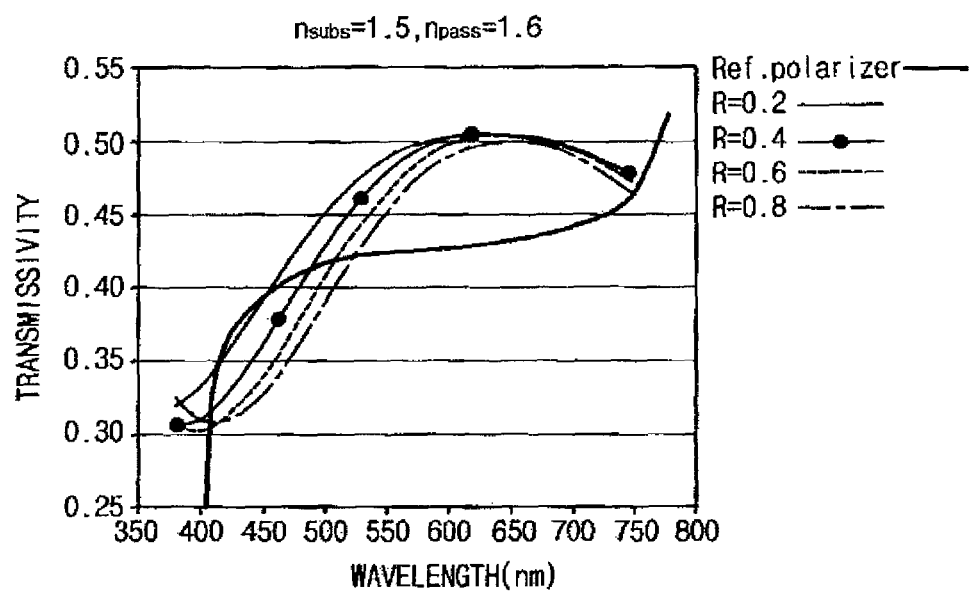
Figure 11C:
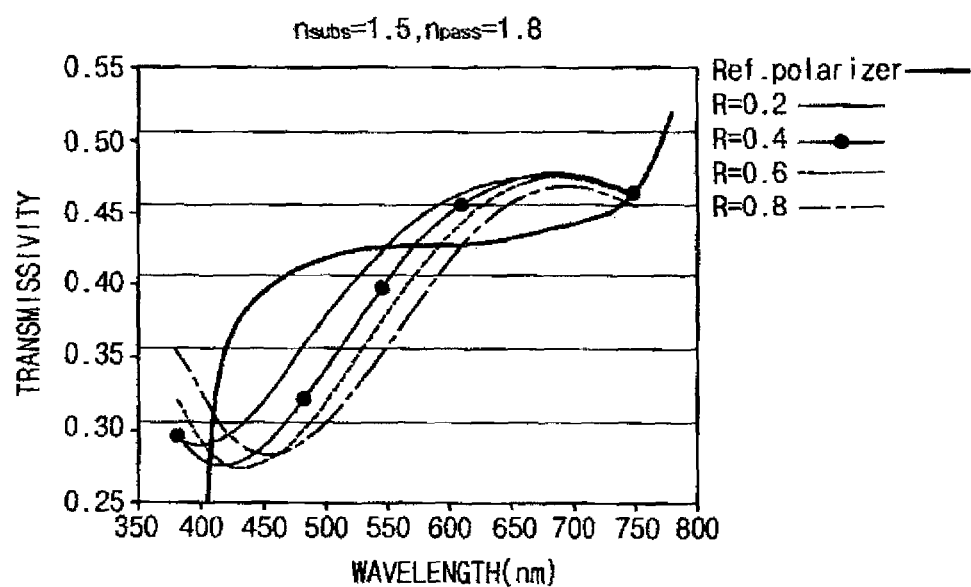

FIGS. 11A to 11C are graphs illustrating light transmissivity according to sizes of air gaps in a passivation layer of the polarizer of FIG. 10. More particularly, FIGS. 11A to 11C are graphs illustrating transmissivity of light through the polarizer according to ratios R of the minimum distance Wa2 over the maximum distance Wa1 (i.e., R=Wa2/Wa1) of the air gaps 330 in the third passivation layer 320 when the refractive index of the third substrate 300 is about 1.5, and when the refractive index of the third passivation layer 320 is about 1.4, about 1.6, and about 1.8, respectively. In FIGS. 11A to 11C, both the third width W5 and the third interval W6 of the third metal pattern 310 are about 50 nanometers. In FIGS. 11A to 11C, a horizontal axis represents wavelengths of the light. Also, in FIGS. 11A to 11C, a reference light transmissivity ("Ref. polarizer") is illustrated.

Referring to FIG. 11A, when refractive index of the third substrate 300 is about 1.5, and when refractive index of the third passivation layer 320 is about 1.4, the transmissivity of light having a wavelength of visible light (e.g., from about 400 nanometers to about 700 nanometers) used in the display panel is greater than the reference light transmissivity if the ratio R of the minimum distance Wa2 over the maximum distance Wa1 is from about 0.2 to about 0.8. Accordingly, when the refractive index of the third substrate 300 is about 1.5 and the refractive index of the third passivation layer 320 is about 1.4, and when the ratio R of the air gaps 330 in the third passivation layer 320 is from about 0.2 to about 0.8, then the light transmissivity of the polarizer is increased.

Referring to FIG. 11B, when refractive index of the third substrate 300 is about 1.5, and when refractive index of the third passivation layer 320 is about 1.6, the transmissivity of light having a wavelength of visible light is greater than the reference light transmissivity if the ratio R of the minimum distance Wa2 over the maximum distance Wa1 is about 0.2. Accordingly, when the refractive index of the third substrate 300 is about 1.5 and the refractive index of the third passivation layer 320 is about 1.6, and when the ratio R of the air gaps 330 in the third passivation layer 320 is no greater than about 0.2, then the light transmissivity of the polarizer is increased.

Referring to FIG. 11C, when refractive index of the third substrate 300 is about 1.5, and when refractive index of the third passivation layer 320 is about 1.8, the transmissivity of light having a wavelength of visible light is lower than the reference light transmissivity regardless of the ratio R of the minimum distance Wa2 over the maximum distance Wa1.

Thus, the polarizer according to present embodiment increases light transmissivity when the refractive index of the third passivation layer 320 is lower than about 1.8.

As mentioned above, the polarizer according to the present embodiment may increase the transmissivity of incident light by adjusting refractive indices of the substrate on which the wire grid pattern is disposed and the passivation layer covering the wire grid pattern, and by adjusting sizes and shapes of air gaps between the substrate and the passivation layer.

Having described the exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A polarizer comprising:
   a substrate having a first refractive index;
   a metal pattern disposed on the substrate, the metal pattern comprising a plurality of protrusions having widths; and
   a passivation layer comprising a silica ink disposed on the metal pattern, the passivation layer having a second refractive index and covering at least one surface of the protrusions.

2. The polarizer of claim 1, wherein the first refractive index is different from the second refractive index.

3. The polarizer of claim 2, wherein the first refractive index is from About 1.4 to about 1.7.

4. The polarizer of claim 2, wherein the second refractive index is from greater than about zero to no greater than about 1.7.

5. The polarizer of claim 1, wherein the first refractive index is substantially the same as the second refractive index.

6. The polarizer of claim 5, wherein both of the first refractive index and the second refractive index are equal to about 1.4.

7. The polarizer of claim 1, wherein the metal pattern comprises at least one of aluminum (Al), gold (Au), silver (Ag), copper (Cu), chromium (Cr), iron (Fe), nickel Ni, and an alloy thereof.

8. The polarizer of claim 1, wherein thicknesses of the protrusions are greater than the widths of the protrusions.

9. The polarizer of claim 1, wherein ratios of thickness over the widths of the protrusions are from about 2 to about 4.

10. The polarizer of claim 1, wherein the passivation layer covers whole outer surfaces of the metal pattern.

11. The polarizer of claim 10, wherein the passivation layer comprises a plurality of air gaps among each of the protrusions.

12. The polarizer of claim 11, wherein ratios of a minimum distance between the air gaps and side surfaces of the protrusions over a maximum distance between the air gaps and side surfaces of the protrusions are from about 0.2 to about 0.8.

13. The polarizer of claim 1, wherein thicknesses of portions of the passivation layer which cover the side surfaces of the protrusions are from greater than about zero to no greater than about 150 nanometers.

14. The polarizer of claim 11, wherein a height of the air gaps is from about 30 nanometers to about 120 nanometers.

15. A polarizer comprising:
   a substrate having a first refractive index;
   a metal pattern disposed on the substrate, the metal pattern comprising a plurality of protrusions having widths; and a passivation layer comprising silicon oxide and polypropylene glycol mono-ropyl disposed on the metal pattern, the passivation layer having a second refractive index and covering at least one surface of the protrusions.

16. The polarizer of claim 15, wherein the first refractive index is different from the second refractive index.

17. The polarizer of claim 16, wherein the first refractive index is from about 1.4 to about 1.7.

18. The polarizer of claim 16, wherein the second refractive index is from greater than about zero to no greater than about 1.7.

19. The polarizer of claim 15, wherein the first refractive index is substantially the same as the second refractive index.

20. The polarizer of claim 19, wherein both of the first refractive index and the second refractive index are equal to about 1.4.

* * * * *